United States Patent Office 3,420,726
Patented Jan. 7, 1969

3,420,726
ORGANOPHOSPHORUS COUPLING AGENTS FOR EPOXY TO GLASS LAMINATES
Malcolm E. Schrader, Brooklyn, and Irving Lerner, Woodside, N.Y., assignors to the United States of America as represented by the Secretary of the Navy
No Drawing. Filed Mar. 30, 1965, Ser. No. 444,085
U.S. Cl. 156—314                          1 Claim
Int. Cl. C09j 5/02

ABSTRACT OF THE DISCLOSURE

Glass surface is treated with an organophosphorus compound selected from the group consisting of diethyl p-aminobenzylphosphonate esters and diethyl bis-2 hydroxyethyl amino methyl phosphonate esters for preventing adsorption of water molecules and to serve as a superior coupling agent between the glass and an epoxy resin in glass reinforced plastics.

---

The invention described herein may be manufactured and used by or for the Government of the United States of America for governmental purposes without the payment of any royalties thereon or therefor.

This invention relates to chemical finishes for glass surfaces and is an improvement over the coupling application Ser. No. 459,954 of Malcolm E. Schrader for Method of Improving the Bonding Characteristics of Glass Surfaces, filed May 28, 1965.

In particular the invention is concerned with the discovery of a new class of compounds for treating or finishing glass surfaces to provide a range of desirable properties which are useful in the production of various glass reinforced laminates.

One of the main uses for glass fibers has been in the production of glass reinforced plastics but the surfaces of glass fibers are not suitable for the formation of a strong bond between organic resinous materials and glass fibers. Also, any bonding which can be developed with an unfinished glass surface will be adversely affected by the formation of a water film on the glass surface upon exposure to high humidity or moisture conditions. In order to obtain an effective bonding relationship between the resinous materials and the surfaces of the glass strands or fibers it is necessary to develop the chemical forces on the glass fibers.

It is known that glass fibers which are finished with certain types of chemicals may be used to produce reinforced plastic laminates of substantially greater strength than laminates produced with unfinished glass fibers. While the strength of the laminates, under normal or so-called dry conditions is increased by the finish, improvement is also observed in the increased wet strength of these laminates. All successful finishes for this purpose are of the type known as coupling agents or chemical compounds which have molecules containing certain functional groups which are capable of forming a chemical bond with the glass surface and also containing functional groups which are capable of forming a chemical bond with the resin.

An explanation for the action of chemical finishes in protecting the reinforced plastics against deterioration in strength from water permeation is believed to be for the reasons that hydroxyl groups are present on glass surfaces as silanol groups, $Si_s$—OH, in which the subscript $s$ denotes a surface atom and that the silanol groups are known to adsorb water molecules. This water adsorption is probably through hydrogen bond formation and water molecules thus adsorbed will in turn adsorb more water molecules, through hydrogen bond formation. Consequently, the surface silanol groups act as centers, or active sites, for the formation of layers of adsorbed water which under conditions of high humidity, for example, can build up to a thickness of layers to a degree where they have the properties of bulk water which will rapidly react with the glass surface. By treating the glass surfaces with chemical compounds which are capable of reacting with the silanol groups on the glass surfaces to form hydrolysis-resistant chemical bonds, the adsorption of water molecules by the silanol group sites can be prevented.

An object of this invention is to react particular organophosphorus esters with the $Si_s$—OH groups of glass surfaces to form coupling agents for providing improved bonding strength to glass reinforced plastics.

Other objects, advantages and novel features of the invention will become apparent from the following general description and examples of the invention.

In the heretofore mentioned Malcolm E. Schrader application, it is shown that organophosphorus compounds react with the silanol $Si_s$—OH of glass surfaces to produce a surface compound having the formula

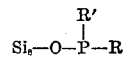

in which R represents the functional group which is active with respect to the particular plastic while R' may represent an unreacted functional group which is active with respect to the glass fibers.

We have discovered that the aminoalkyl or amino aryl phosphonates of the organophosphorus ester group react with surface of glass fibers to provide surface finishes which function as coupling agents for greatly improving the strength of epoxy resin glass reinforced laminates.

The specific coupling agents with which the present invention is concerned are diethyl-p-aminobenzylphosphonate having the formula

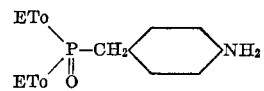

and diethyl bis-2 hydroxyethyl amino methyl phosphonate having the formula

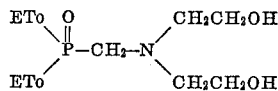

Both coupling agents are diethylaminoalkyl or aryl phosphonate and have the general formula of

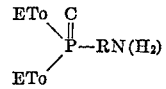

Glass fibers have been treated with these compounds and the plastic laminates prepared therefrom have under the flexure test of the laminates shown very high dry strength characteristics equal to or better than other coupling agents which are used in commerce.

The method for treating the glass fibers in accordance with this invention in order to provide good adherence with resins is to immerse the fibers for a short period of not more than 5 minutes and preferably for 2 minutes in a solution formed of diethyl p-aminobenzylphosphonate which may, for example, be a 1% water solution. The fibers are removed from the solution, allowed to dry and then cured at elevated temperatures of upwardly of 230° F. for between 5 and 10 minutes in order to set the solution on the surface of the glass fibers.

In forming an epoxy glass laminate, a suitable number of plies of glass cloth, for example 12, are treated according to the general method explained above. The epoxy resin is prepared by mixing 400 parts of a good commercial epoxy resin with 360 parts of catalyst, such as methyl nadic anhydride and 4 parts of an accelerator, such as benzyldimethylamine. The epoxy resin mixture is applied to the surfaces of the treated glass cloth plies and the layers formed into a laminated composite and the composite placed in a mold. The mold is preliminarily heated to 125° F. and any air bubbles are removed after which the composite is cured at between 200° F. and 250° F. for about 2 hours and the laminate finally baked at 350° F. for about 2 hours.

Laminates were made according to the general method set forth above in which the glass fibers were treated with a solution of diethyl bis-2 hydroxyethyl-amino methyl phosphonate.

Obviously many modifications and variations of the present invention are possible in the light of the above teachings. It is therefore to be understood that, within the scope of the appended claim, the invention may be practiced otherwise than as specifically described.

We claim:
1. The method of producing a glass-epoxy resin laminate which comprises,
  (a) immersing several layers of glass cloth in a solution of an organophosphorus compound selected from the group consisting of diethyl p-aminobenzylphosphonate ester and diethyl bis-2 hydroxyethyl-amino methyl phosphonate ester for 2–5 minutes and then removing the glass cloth from the solution and drying the glass cloth,
  (b) subjecting the layers of dried glass cloth to a temperature upwardly of 230° F. for between 5 and 10 minutes,
  (c) then applying an epoxy resin mixture to the surfaces of the layers of glass cloth and forming a laminated composite thereof,
  (d) then curing the composite at a temperature between 200 and 250° F. for about 2 hours and
  (e) finally baking the composite at about 350° F. for about 2 hours.

References Cited

UNITED STATES PATENTS

| | | | |
|---|---|---|---|
| 2,974,062 | 3/1961 | Collier | 117—76 |
| 3,150,208 | 9/1964 | Carson et al. | 117—126 X |
| 3,268,468 | 8/1966 | Barnstorff et al. | 161—185 X |
| 3,344,107 | 9/1967 | Miller | 260—37 |

OTHER REFERENCES

Lee, Henry, and Neville, Kris, Epoxy Resins, McGraw-Hill Book Co.; New York, 1957 (pp. 243–248) (Copy in Group 160).

Shechter, Leon, Wynstra, John, and Kurkjy, Raymond, "Glycidyl Ether Reaction with Amines," Industrial and Engineering Chemistry, vol. 48, January 1956 (pp. 94–97) (161—Epox Digest).

Kosolapoff, Gennady M., "The Synthesis of Amino-substituted Phosphonic Acids," J. Am. Chem. Soc., 69, 2112–2113 (1947).

EARL M. BERGERT, *Primary Examiner.*

R. A. KILLWORTH, *Assistant Examiner.*

U.S. Cl. X.R.

156—330; 161—185, 191; 117—126; 260—37